July 7, 1942.  B. W. FOSS  2,289,003
AUTOMATIC RESET DEVICE FOR COMPUTERS
Filed Aug. 9, 1939  7 Sheets-Sheet 4
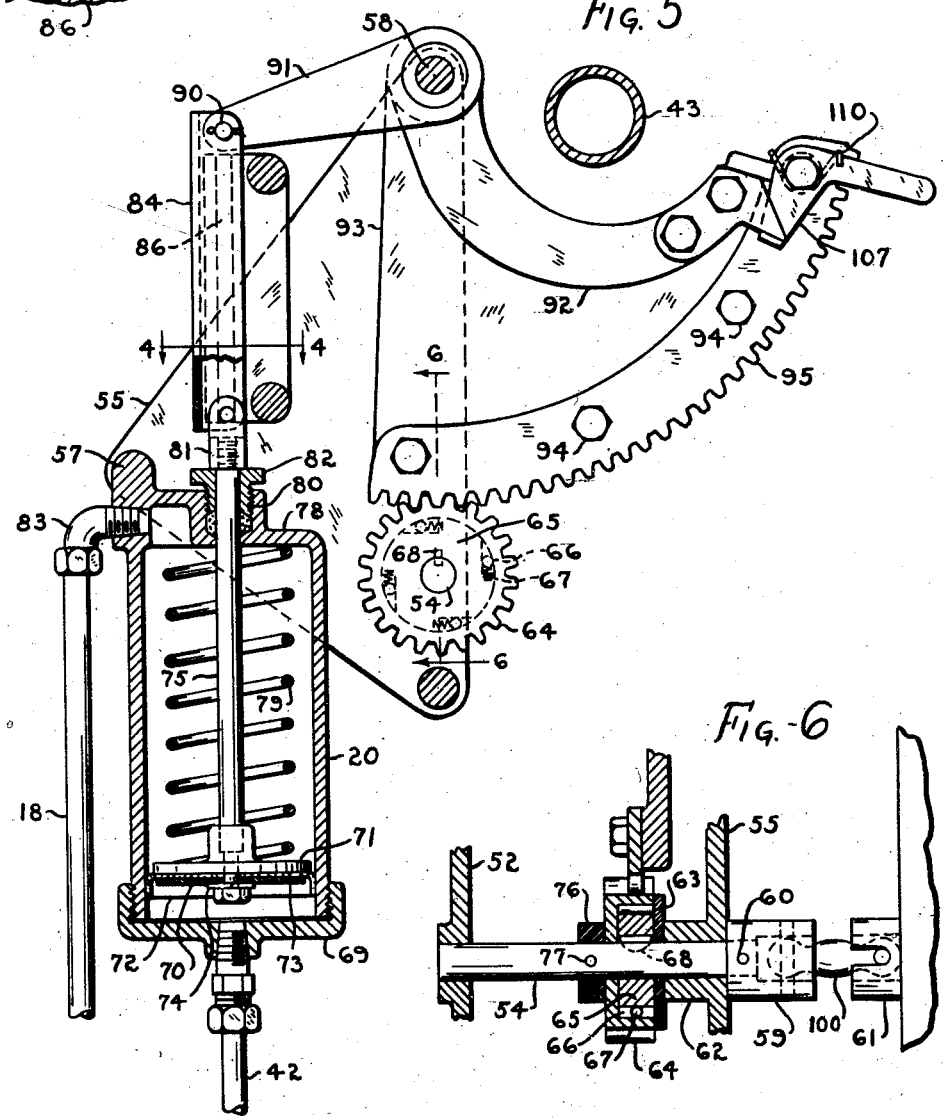
INVENTOR.
Burdette W. Foss
BY: Cox & Moore
ATTORNEYS

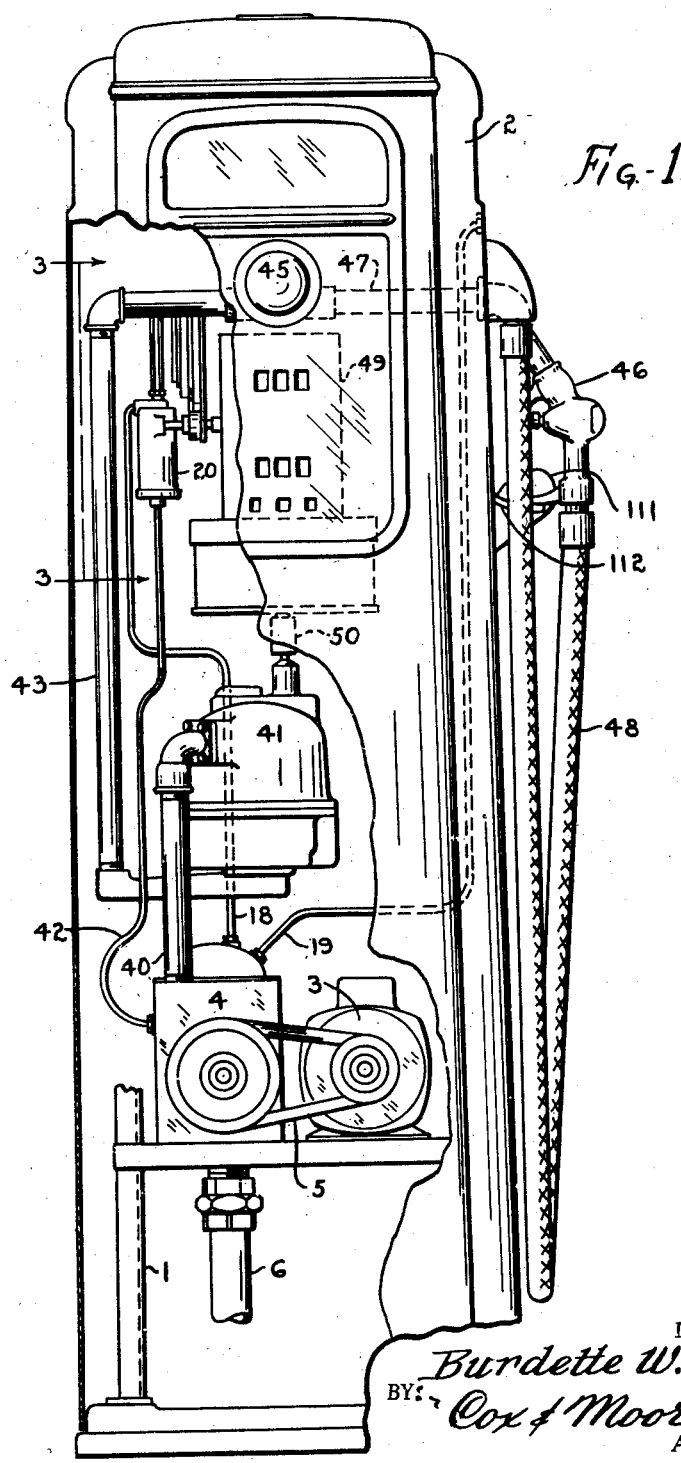

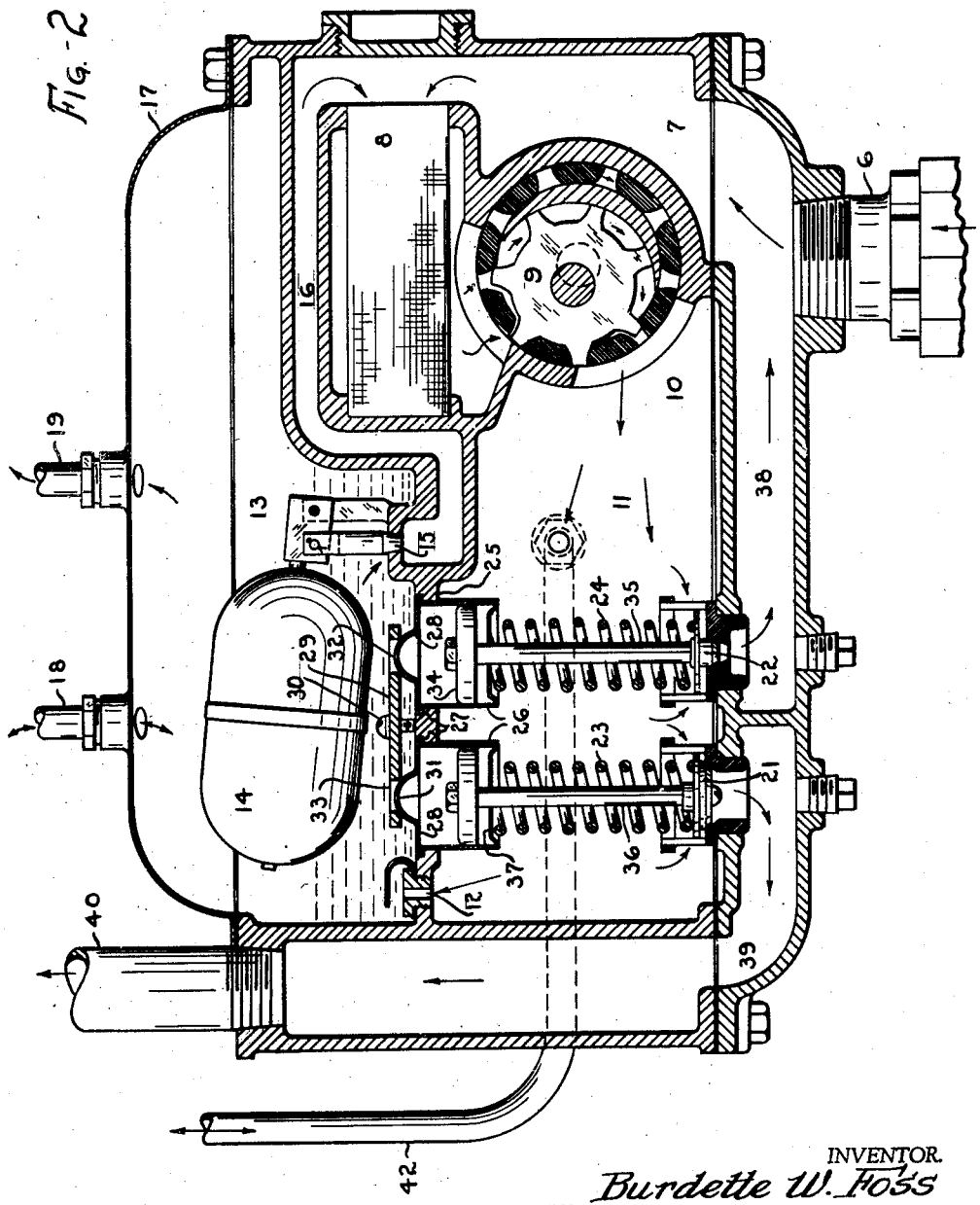

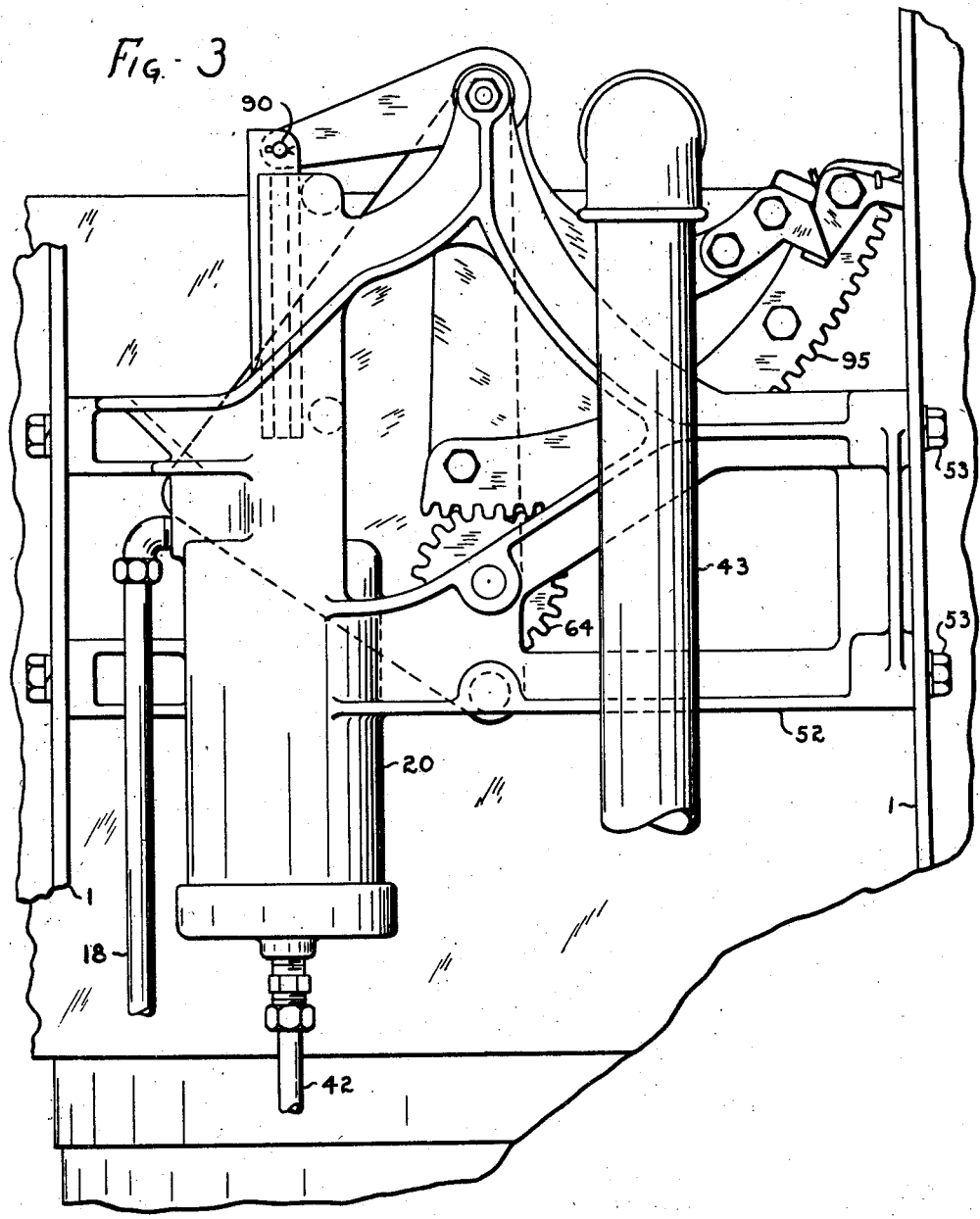

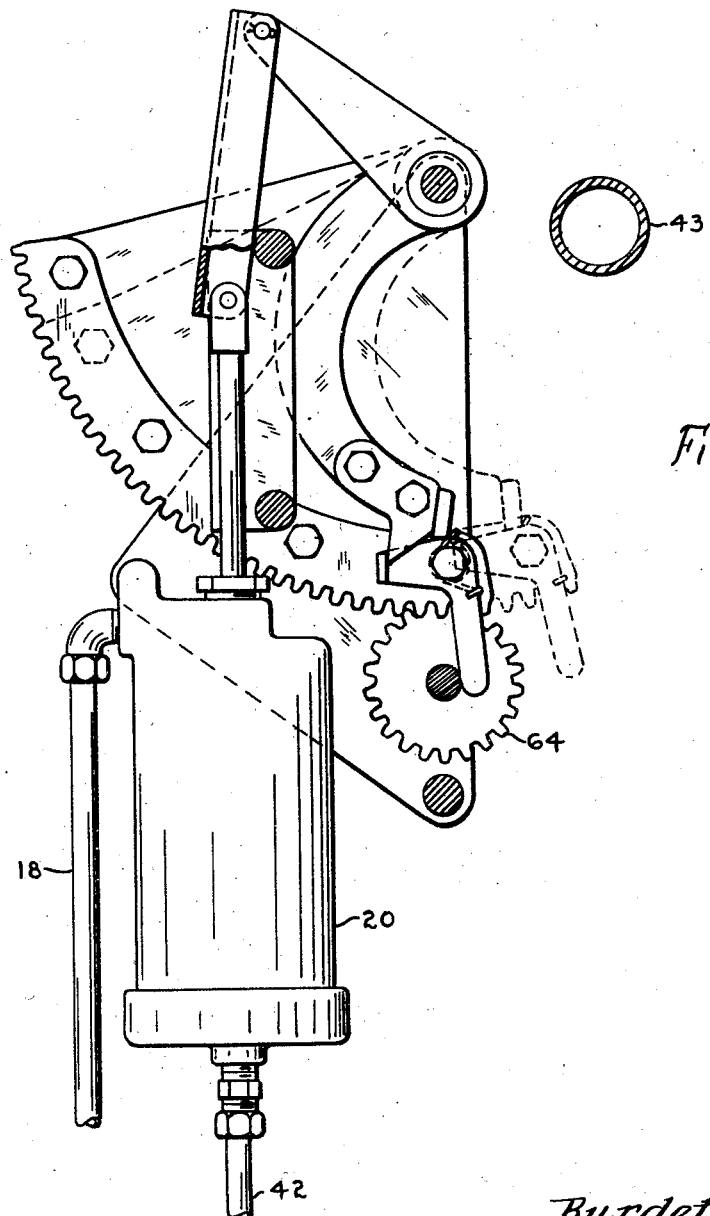

July 7, 1942.　　　B. W. FOSS　　　2,289,003
AUTOMATIC RESET DEVICE FOR COMPUTERS
Filed Aug. 9, 1939　　　7 Sheets-Sheet 6
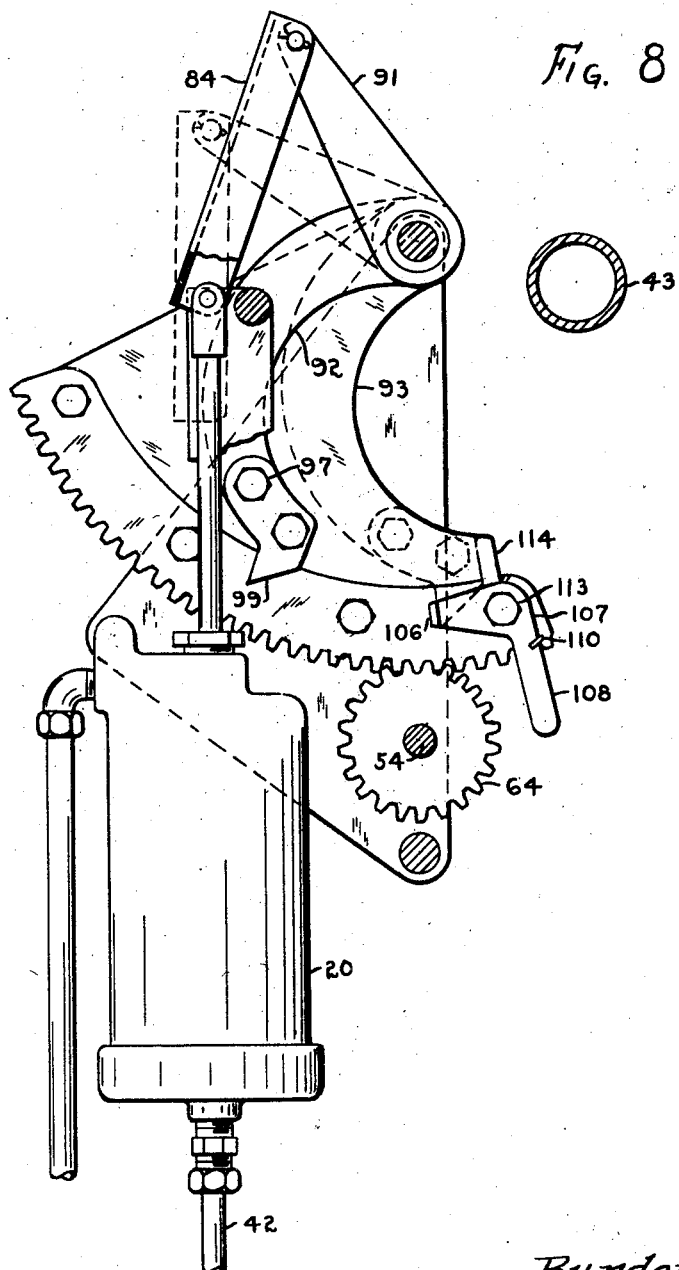
INVENTOR.
Burdette W. Foss
BY: Cox & Moore
ATTORNEYS

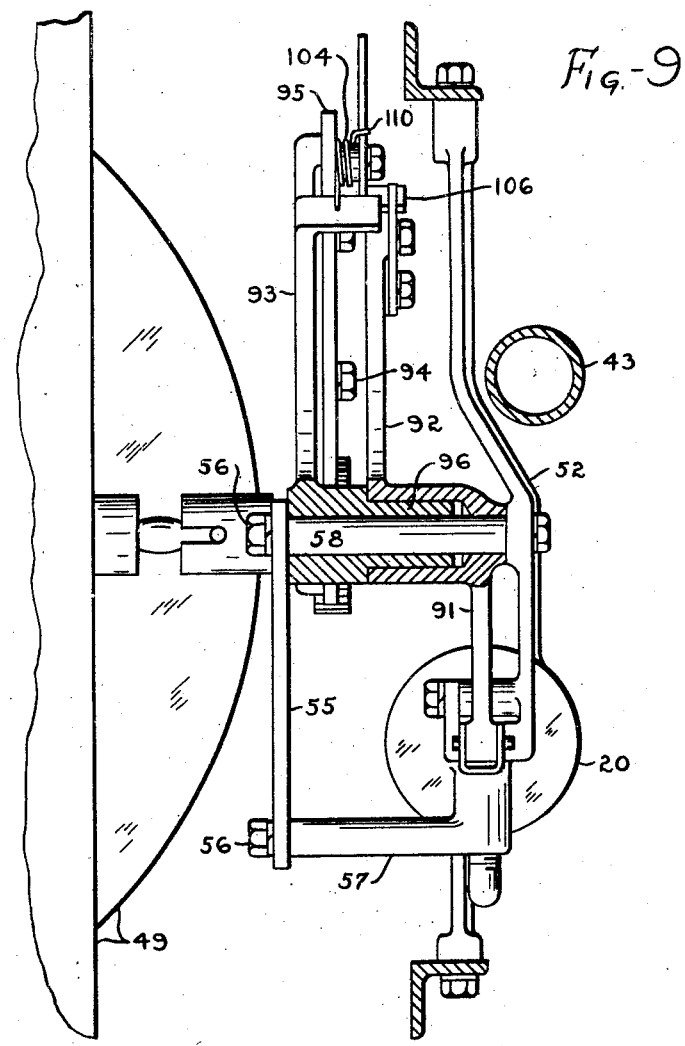

Patented July 7, 1942

2,289,003

UNITED STATES PATENT OFFICE 2,289,003

AUTOMATIC RESET DEVICE FOR COMPUTERS

Burdette W. Foss, Fort Wayne, Ind., assignor to Tokheim Oil Tank and Pump Company, Fort Wayne, Ind., a corporation of Indiana Application August 9, 1939, Serial No. 289,160

28 Claims. (Cl. 221—95)

This invention relates to liquid dispensing devices and more particularly to gasoline and other motor fuel dispensing pumps of the type having volume and/or price registering or indicating means adapted to be actuated synchronously and proportionately to the liquid being dispensed whereby at any time the cost at a fixed price per unit and also the volume of the gasoline dispensed may be known. The present invention relates particularly to means for resetting the indicating means to a predetermined position such, for instance, as zero, whereby at the initiation of the next subsequent dispensing operation the indicating means will necessarily start at zero thereby precluding fraudulent indications.

Among the objects of the present invention are to provide an automatic resetting mechanism for the price and/or volume indicating mechanism of a service station pump wherein the resetting is automatically accomplished by a fluid pressure condition existent in the dispensing line and in a manner whereby there is eliminated the necessity of providing an inner lock between the resetting mechanism and the motor operating switch; to provide an automatic power actuated resetting mechanism for the volume and/or price computing mechanism of a service station pump wherein the fluid pressure condition in the air release mechanism disposed in the dispensing line is utilized to actuate the resetting mechanism and in such a manner that certain and positive actuation is accomplished necessarily at the beginning of and prior to the dispensing operation and irrespective of any fluctuation of fluid pressure in the air separator due to the accumulation of air or vapor in the dispensing line; to provide an automatic fluid pressure actuated resetting mechanism for a liquid dispenser of the character indicated which is simple in construction, certain in operation and possesses the inherent advantages of the construction herein described; to provide a resetting mechanism for a service station pump of the character described, power actuated by means of fluid pressure in the dispensing line constructed and arranged whereby the resetting mechanism is automatically actuated only below certain fluid pressure conditions in the dispensing line and whereby the inadvertent actuation of the resetting mechanism is precluded; to provide a fluid pressure operated resetting mechanism for a service station pump of the character indicated wherein the resetting mechanism is operative at a relatively low fluid pressure as distinguished from a much higher fluid pressure requirement for the dispensing operation itself whereby to insure that the resetting operation will automatically take place at the beginning of and prior to dispensing and will not be inadvertently operated in the event of a relatively smaller pressure drop in the dispensing line; to provide an automatic resetting device for computers and the like which eliminates an added load being placed on the computer and meter to carry out the resetting operation; to provide a fluid pressure operated resetting mechanism for a dispensing or service station pump wherein the air release mechanism is utilized as a part of the mechanism for compelling an automatic resetting operation prior to a dispensing operation but which serves to prevent inadvertent resetting; to provide a pressure operated mechanism for resetting computing devices of service station pumps by means which permits the pressure on the inlet side of the reset operating mechanism, to-wit, the operating pressure, automatically to be brought back to a constant predetermined pressure, and specifically to atmospheric pressure, at the end of each dispensing operation, whereby the mechanism operating at a higher pressure may be set at any given value so that such mechanism will necessarily release the pressure in the dispensing line at the termination of the dispensing operation and also whereby the mechanism can be operated at a relatively low pressure; to provide a pressure operated reset mechanism for a service station pump wherein the air separator is utilized as a part of the pressure operated mechanism for the reset device and whereby the pressure chamber of the air release may be utilized as the pressure chamber for the reset mechanism and wherein the relief chamber for the air release may be utilized as the pressure releasing mechanism for the reset mechanism; to provide these and other objects of invention as will be apparent from a perusal of the following specification when taken in connection with the accompanying drawings, wherein:

Figure 1 shows a gasoline or service station pump of the conventional type, the same being a price and/or volume computer, with part of the housing broken away to show the adaptation of the invention thereto;

Figure 2 is a section through an air separator for the gasoline pump to show the connections to this invention;

Figure 3 is a view as shown in Fig. 1 of the automatic reset device attached to the side of the computer.

Figure 4 is a section as indicated in Fig. 5 on line 4—4 to show the structure of the cross head guide.

Figure 5 is a view similar to Fig. 3 except the outer supporting bracket is removed to show the detailed working parts, some of the chamber being shown in section.

Figure 6 is a section taken on line 6—6 of Fig. 5.

Figure 7 is similar to Fig. 5, except the moving parts are shown in a different position.

Figure 8 is similar to Figs. 5 and 7 showing their parts in position after the computer is reset and the pump motor is running.

Figure 9 is a plan view of Fig. 3 showing the main bearing in section.

Referring now to the drawings in detail:

In Figure 1 is shown a more or less conventional type of dispensing pump preferably of the computer type which is adapted not only to compute the volume but also the price. The invention is equally adaptable to any type of volume and/or price indicating pump wherein indicating or registering mechanism is synchronically operated in accordance with the liquid flow through the metering or liquid measuring mechanism. In the present instance, the computing mechanism is shown as positively driven by the meter shaft, but other adaptations are within the contemplation of this invention.

Referring now to Fig. 1, the invention shows the usual type of angle iron frame or skeleton upright 1 which supports the conventional type of housing 2 and within which housing is positioned the other internal units of the pump such as the electric motor 3 driving the pump 4 through suitable gearing such as the belt 5. The pump 4 is adapted to draw gasoline from a supply tank, not shown, upwardly through the pipe 6 forming a part of the dispensing line, into the suction chamber 7 and an air separator or air release mechanism shown particularly in Fig. 2. In the present instance, the air separator is of the type preferably as shown in a patent to Bechtold, No. 1,868,444, patented July 19, 1932, comprising a housing or other casting having internal partitions. The pump has an inlet chamber or suction chamber 7 connected with the pipe 6 and connecting with a preferably cylindrical screen 8 through which the entering gasoline flows on its way to the pump 9. The pump is shown preferably as an internal gear type but any type of pump may be utilized. The gasoline is discharged from the port 10 into a separation chamber 11 which is adapted to separate air and/or vapor from the gasoline, discharging the air and/or vapor to atmosphere while passing the gasoline to and through the dispensing line. In the air separator any air entering the chamber 11 will necessarily rise to the top and pass through the small orifice 12 into the superior float chamber 13. If no air be present, a small amount of gasoline will pass through this orifice 12 when the pump is running, but if or when the amount of gasoline in the chamber 13 rises to such a level as to raise the float 14, this, in turn, opens the valve 15. This additional flow of liquid is thus returned to the suction side of the pump 9 by means of the conduit 16. The float chamber 13 is preferably covered by a metal dome 17 to which in the present invention are connected two tubes 18 and 19. Tube 19 serves as a constantly open vent to the atmosphere. This tube passes upwardly and out through the housing 2, as shown in Fig. 1. Thus the float chamber 13 is always under normal atmospheric pressure.

Tube 18, which is not disclosed in the prior Bechtold patent, leads to the upper end of a cylinder 20 hereinafter more fully described in detail.

As in accordance with the prior Bechtold patent, the separation chamber 11 is provided with two pressure operated valves 21 and 22 normally held closed by springs 23 and 24 respectively. Valve 22 is known as the by-pass valve, while valve 21 is a regulating valve. In the dividing partition 25 which divides the pressure chamber from the float chamber, there are provided two openings adapted to receive the cylinders 26. The upper ends of these cylinders have an annular flange 27 which fits into a counterbore in the casting. On top of these flanges are covers 28 which are clamped thereon by the bar 29 and screws 30. In the center of these cylinder covers 28 is a dome-like portion 31 apertured centrally as at 32. The bar clamp 29 is provided with holes 33 which register with the vent holes 32 whereby to allow the upper ends of these cylinders 26 to be open to atmospheric pressure through the gasoline in the float chamber 13 and the atmospheric vent tube 19. Within each cylinder 26 is a piston 34 secured to valve rods 35 and 36. On the lower ends of the cylinders 26 are spring retainer disks 37 having a large clearance hole in their centers to allow liquid under pressure to act upon the bottoms of the pistons 34 when the pump and motor are operating. Compression springs 23 and 24 are disposed between the respective valves and the retainers 37 for holding the valves closed until sufficient pressure is created in the separation chamber 11 by the pump 9 whereby to act upon the pistons 34 and open the valves against their springs. Below the valve 22 is a by-pass duct 38 which opens into the suction chamber 7. Below the valve 21 is a duct 39 the top of which is attached to a pipe 40 constituting a part of the dispensing line and leading in the inlet side of the meter 41. Attached to the side of the separator chamber 11 is another tube 42 the other end of which is attached to the bottom of the cylinder 20 of the resetting device.

From the outlet side of the meter, the dispensing line 43 flows through a liquid flow gauge 45 and from thence the gasoline passes through the usual type of flexible hose mounted on the outside of the housing or casing 2. This hose is provided with the conventional type of nozzle valve 46. The meter 41 drives the computer 49 by means of the drive shaft coupling 50. The computer may be of the conventional type used today or may be just a simple type of counter. For this discussion, the mechanism is devised to resetting the type of computer generally known as a Veeder-Root manufactured by the Veeder-Root Company of Hartford, Connecticut. On this type of computer the reset shaft does not rotate when the computer is being driven. To reset, the shaft must be turned 405 degrees counterclockwise, looking at the computer from the reset side, as viewed in Fig. 3 and it will then rock back 45 degrees.

In Fig. 3 the angle iron frame 1 is shown as supporting the bracket 52 which has a cylinder 20, preferably cast integral therewith, screws 53 securely fasten the bracket 52 to frame members 1. A short shaft 54 is journaled in the bracket 52 and bearing plate 55 which is attached to the bracket 52 by means of cap screws 56 threaded into the bracket boss 57 and bearing stud 58 as shown in Fig. 9. On the inner end of the shaft 54 is a coupling 59.

By reference to Fig. 6 it will be seen that on the inner end of shaft 54 is a coupling 59 secured by means of a pin 60. Between this coupling 59 and the computer coupling 61 is a coupling shaft 100. On the other side of the shaft bearing 62 is a ball clutch retainer washer 63. This washer 63 rides against the face of the pinion gear 64 bored to receive the roller clutch having a core 65 and rollers 66 under tension of the springs 67. The core 65 is keyed to shaft 54 by means of key 68 and therefore rotates with the shaft at all times. The pinion gear 64 with its internal clutch is held between the bearing 62 and the collar 76 which is pinned to the shaft 54 with the pin 77. As can be seen, this gear 64 is connected to the shaft 54 by the roller clutch in only one direction of rotation.

By reference to Fig. 5 it will be seen that the lower end of the cylinder 20 is closed by a cap 69 to the center of which is attached a tube 42. This tube may be made of any desired internal diameter. Within the cylinder is disposed a piston 70 composed of a base 71, a piston leather 72, retainer 73 and washer 74, all of which are securely attached to piston rod 75 by means of a nut. Compressed within the cylinder between the upper end 78 of the cylinder is a spring 79. In the upper end 78 is a stuffing box 80 for the piston rod 75. Threadedly engaged to the upper end of the piston rod 75 is a coupling 81 the lower end of which serves as a stop against packing gland nut 82 whereby to prevent the piston from striking the bottom of the cylinder on its downward stroke. The tube 18 is connected to a cover 17 of the chamber 13 and the upper end of the cylinder 20 as at 83.

The coupling 81, is positioned between the members of a U-shaped link 84, shown in Fig. 4. These two parts are pinned together with a pin 85 the ends of which are guided in the grooves 86 and 87. Groove 86 is in the casting bracket 52, while groove 87 is in the guide plate 88 attached to the bracket 52 by means of cap screws 89. A pin 90 hingedly connects the link 84 with an arm 91. On the bearing stud 58 (see Figs. 5 and 9) two separate parts are journaled, first arms 91 and 92 are all one casting, and second the segment 93 having a gear segment 95 attached thereto by means of cap screws 94. The extended bar 96 of the segment 93 gives a longer bearing surface to guide the segment. Attached to the outer end of the arm 92 by means of cap screws 97 is a latch or finger 99. At the right hand side or end of the segments 93 and 95 is an outwardly extending boss 104 which supports a latch 106 which is turned out from the supporting plate 107. At substantially 90 degrees a cam arm 108 is disposed for contacting the shaft 54. This latch or plate 107 is normally held against the stop 114 by torsion spring 110.

Operation

In the present device I have shown the nozzle 46 as temporarily supported upon a nozzle support 111 stationarily mounted on the outside of the casing 2 and directly associated with the pump motor control switch arm 112. It is not necessary that the nozzle be supported upon a stationary support 111, nor is it necessary and, indeed it is not to be preferred, that the nozzle or nozzle support be associated with the pump motor switch lever 112. The showing in the present instance has been made purely for purposes of exemplification.

In the operation of the present invention, the attendant turns or operates the pump motor control switch whereby to start the pump 4 for drawing gasoline from the underground supply tank and forcing it through the dispensing line. As the gasoline flows through the pipe 6 it enters the combined pump and air separator mechanism shown in Fig. 2, passing through the screen 8 into the intake bore of the pump 9. The pump discharges into the separation chamber 11. When the pump is idle both valves 21 and 22 are in closed position. However, when the pump starts in operation the nozzle valve will be closed so that the dispensing line will be full of liquid. Therefore, when the pump forces gasoline into the chamber 11 a pressure is created which acts against the bottom of the pistons 34 of the valves and tends to cause them to raise. Spring 23 is a weaker spring than spring 24 and will allow the valve 21 to open when approximately 20 pounds is created in the separation chamber 11. On the other hand, valve 22, which is a by-pass valve, opens and only opens when the nozzle is closed, thereby causing the opening of the by-pass valve in the separation chamber 11 which opens at approximately 22 pounds. When the nozzle valve is open and the pump is normally operating, sufficient pressure is built up in the separation chamber 11 to open the valve 21. If the pressure should momentarily drop due to an accumulation of air or vapor entering the chamber 11 through inlet 6 and pump 9, the pump will not be able to maintain a pressure of approximately 20 pounds in the separation chamber and this valve will accordingly close, but only temporarily. When the nozzle is closed, valve 21 will remain closed but the by-pass valve 22 will open so that gasoline may by-pass through this valve to the duct 38 and then into the chamber 7 and through the pump in a cyclic fashion.

During the operation of the pump when the nozzle valve and valve 21 are open, any air which may be entrained in the gasoline will naturally rise to the top of the separation chamber 11 and will be forced out through the small orifice 12 into the chamber 13 and will freely escape to the atmosphere through the constantly open outlet 19. On the other hand, if no air be present, a relatively small stream of gasoline will constantly flow through the small orifice 12, such gasoline collecting in the chamber 13 and raising the float valve 14 to open the valve 15 whereby to return this liquid back to the suction side of the pump through the passageway 16. It will thus be seen that the separation chamber 11 is under pressure whenever the pump is operated and is under atmospheric pressure when the pump is idle. The small orifice 12 allows pressure to equalize or to relieve the chamber 11 when the pump is idle. However, the orifice 12 is so small that only a small amount of gasoline can flow through it during the actual operation of the pump and it does not materially affect the delivery of the pump. However, the orifice is of such dimension as to permit the air to pass through to atmosphere at all times.

Referring now to the condition when the pump has started to operate and the nozzle valve is closed:

When the pump builds up the pressure in the separation chamber 11, before the pressure is built up to 20 pounds whereby to open the valve 21, the liquid will be forced from the separation chamber 11 to pipe 42. In Fig. 5 the construction shows the piston 70 and all its associated parts in position when the pump is not operating. The liquid pressure transmitted through the tube 42 to the lower end of the cylinder 20 forces the piston 70 upward causing it to compress the spring 79 and raise the link 84 which in turn rotates the arm 91 in a clockwise direction. Since arms 91 and 92 are integral, arm 92 moves in a clockwise direction. At the outer end of arm 92 a latch 99 engages latch 106 which in turn is attached to the toothed segment 93. Therefore, when the arm 92 travels in a clockwise direction it carries with it the segment 93; the gear segment 95 being carried rotates the pinion 64 in an anti-clockwise direction.

The internal roller clutch of the pinion gear 64 is gripped by the gear and rotates therewith as long as the same travels in the same direction. This internal clutch being connected to the shaft 54 rotates the latter which in turn is attached to the resetting shaft coupling 61. Hence, when the liquid pressure in the cylinder 20 has driven the piston, it is in the position shown in Fig. 7. The cam arm 108 contacts the shaft 54 to trip the latch 106 from the cooperative latch 99 at this point and the mechanism is so designed that the gear 64 has been rotated 405 degrees in anti-clockwise direction. The piston 70 in the cylinder 20 is now disconnected from the computer resetting shaft by reason of the unlatching of the latch 106 and its associated latch 99. The computer will then automatically rotate backwards, or in a clockwise direction, 45 degrees. This last mentioned rotation is characteristic of the Veeder-Root type of computer. This Veeder-Root type of computer is further identified as Standard 12" computer with price synchronizer, Veeder-Root symbol—12–V. S. A. This also carries with it a gear segment 95 which takes up a position as shown in the dotted lines in Fig. 7. The regulating valve 21 will not open until resetting has taken place due to the fact that pressure to open valve 21 will not build up sufficiently during the time that the piston 71 is being forced upwardly to accomplish resetting. Thus, complete resetting has been accomplished prior to any dispensing operation.

Fig. 8 therefore shows all parts as they will appear when the computer has been reset and the pump 9 is operating. The computer has been reset and the gasoline may be dispensed to the customer's car upon opening the nozzle valve and all these parts will remain in position as long as the pump is operating.

Upon the actuation of requisite pressure in the separating chamber 11 to actuate the reset mechanism, and also to force a constantly flowing small stream of liquid and/or air through the aperture 12 to the float chamber 13, the pressure in the separator chamber 11 will continue to rise until 20 pounds has been reached, at which time the auxiliary valve 21 opens, thereby connecting the separating chamber 11 with the dispensing line 49. If the nozzle valve be closed, the pressure will continue to rise in the separator chamber 11 until 22 pounds is reached, at which time the by-pass valve 22 will open and thereafter the pump will continuously by-pass, as is well known in the art. Resetting having been accomplished, if the nozzle valve is now opened the pressure in the separation chamber 11 will drop and the by-pass valve 22 will close. The auxiliary valve 21 remains open so that dispensing will occur through the dispensing line. Now, if, during dispensing, a large volume of air or vapor is passed through the dispensing line by the pump, the separation chamber pressure will accordingly drop since the volume of air will be forced through the restricted outlet 12 to the atmosphere. However, upon this drop in pressure in the chamber 11, only the auxiliary valve 21 will close. The pressure will not drop low enough to in any wise affect the resetting operation. As soon as the air has been passed out of the separation chamber, pressure therein will build up to again open valve 21 to maintain the dispensing operation.

Upon the completion of a dispensing cycle, and when the manual operation of the pump motor switch to stop the pump is completed, pressure in the separation chamber is immediately relieved through the small orifice 12, the float chamber 13 and to atmosphere through the tube 19. This same drop in pressure will be communicated through tube 42 to the cylinder 20 which will be put at atmospheric pressure. When the pressure is relieved below the piston 70, the spring 79 will act upon the top of said piston and force it downwardly to the bottom of the cylinder 20. By a downward movement of the piston 70 and its rod, the link 84 is also pulled downwardly so that arms 91 and 92 travel in a counterclockwise direction. In the meantime, the tube 18 which connects the coupling 83 to the upper end of the cylinder 20 and the float chamber 13 which is now under atmospheric pressure, allows breathing to the upper side of the piston 70 in the cylinder 20. In other words, when the piston 70 is forced upwardly, the air on the upper portion of the piston is displaced into the float section 17 which in turn vents to atmosphere through the tube 19, and, when the piston is in its downward travel, air can fill the upper portion by entrance of air into the upper end of the cylinder. In the downward movement of the piston 70 the arms 91 and 92 are rotated in anti-clockwise direction and on the lower end of the segment 93 there is a boss 114 which the latch 99 on the outer end of lever 92 abuts when it reaches the position of this boss. The remainder of the travel of the arm 92 and its associated parts carries with it the segment 93. At the same time, when the latch 99 on the arm 92 contacts the boss 114, the finger 99 latches behind the latch 106 and the small torsion spring 110 will hold the latch 106 against the boss 114 which serves as a stop. As the gear segment 95 is brought back to its original position, as shown in Fig. 5, it rotates the pinion gear 64 in a clockwise direction, but in rotating the pinion gear 64 in this direction it does not affect the resetting shaft 61 or its shaft 54 because the roller clutch is not affected in this direction of rotation. The pump is idle and the piston 70 is down to the bottom of the cylinder 20 and the computer has not been reset.

It is to be noted that during the operation of the pump when the separation chamber 11 carries 20 pounds of pressure, more or less, the drop in pressure therein due to air entering the air separating chamber will not drop the pressure sufficiently low to permit the automatic resetting of the resetting mechanism during any dispensing operation; that the resetting mechanism can automatically be operated only when the pressure in the separation chamber is dropped sufficiently low, approaching atmospheric pressure, to permit the spring mechanism 79 in the cylinder 20 to act to drive the piston downwardly. This spring mechanism is constructed and arranged to act at a very low pressure in the separation chamber, i. e., lower than any pressure that could be present when a relatively large volume of air is passing from the air separator chamber and is being separated from the gasoline being dispensed through the dispensing line. Hence, it will be apparent that in the present invention the reset mechanism is power actuated by the fluid pressure in the dispensing line, specifically by the fluid pressure in the air separator, and in such a manner that a drop of pressure in this chamber occasioned by the separation of air in the air separator itself cannot cause inadvertent actuation of the resetting mechanism. It is also apparent that the resetting mechanism is conditioned for resetting only upon the presence of atmospheric pressure in the separator chamber due to the stopping of the pump after a dispensing operation, which stopping restores the air separator pressure of the dispensing line to atmospheric pressure conditions which, in turn, affect reconditioning of the resetting mechanism. Resetting is automatically accomplished upon a subsequent predetermined rise in pressure in the dispensing line when the pump thereafter is started. It will also be apparent that by utilization of the resetting mechanism in connection with the air separator mechanism, as shown in Fig. 2, embodying the auxiliary valve 21 the dispensing line is maintained full of liquid after the dispensing operation and that the creation of the pressure condition in the air separator chamber 11 is sufficient to actuate the resetting mechanism without opening the valve 21 or without disturbing the liquid-full condition of the dispensing line from the valve 21 to the end of the hose at the nozzle valve so that the dispensing line is normally maintained full of liquid and is not put under unusual pressures such as would cause bulging of the flexible hose or would cause a backward movement of liquid through the meter and thereby create an inadvertent movement of the computing mechanism.

It is also apparent that by reason of the present construction the necessity of interlocking means between the pump control switch and the resetting mechanism has been eliminated, since the reset mechanism is automatically and power actuated by means of a predetermined fluid pressure condition in the dispensing line when the pump motor is first put in operation. Furthermore, the present operation of the resetting mechanism to accomplish resetting prior to any dispensing operation is not dependent upon an electric motor to accomplish resetting, and is not dependent upon a co-action between a motor switch lever and a nozzle support.

It will also be appreciated by reason of the present invention that there is provided a power actuated reset device wherein means is provided upon the termination of the dispensing operation for automatically relieving the pressure to a constant predetermined pressure, specifically to atmospheric pressure. This is due to the fact that the air release is vented to the atmosphere and that the side of the pressure operated cylinder in which the spring is placed is connected to the air release and to the atmosphere. The operating mechanism may be set to operate at any given value with the assurance that it will correctly function. For instance, in the present device, inasmuch as the pressure side of the line 42 is returned to zero at the end of each dispensing operation, the reset cylinder and piston-operating mechanism may be set to operate at a very low pressure as distinguished from a construction wherein that portion of the line is maintained under a relatively high pressure after the dispensing operation. In addition it is to be recalled that in the present device the liquid in the line 42, after the resetting has been consummated, is returned to the pressure chamber 11 of the air release so that it does not have to be repumped through the system.

Still another important object lies in the fact that the air release itself is utilized as a part of a pressure operated, automatic reset mechanism whereby the pressure chamber and the atmospheric chamber of the air release have two functions: (1), the usual or air release function, and (2), the function of forming a pressure chamber for the resetting mechanism and forming an atmospheric chamber for relieving the resetting pressure chamber after resetting.

The invention is hereby claimed as follows:

1. In a liquid dispensing device, the combination of means forming a dispensing line through which liquid is adapted to flow under pressure, power driven pumping means for delivering liquid through said line, a meter in said line adapted to be actuated by the fluid flowing therethrough, indicating means, mechanism for driving the indicating means in synchronism with the operation of said meter, resetting means for said indicating means, valve means in said dispensing line adapted to be opened by predetermined fluid pressure in said line, and means connected with said line in advance of the inlet side of said valve means and adapted to be actuated by a relatively lower predetermined pressure than said first-named pressure for automatically actuating said resetting means.

2. In a liquid dispensing device, the combination of means forming a dispensing line through which liquid is adapted to flow under pressure, metering means in said dispensing line, said metering means having an indicator mechanism for actuating the indicating means in synchronism with the meter, resetting means for said indicator including pressure actuatable means, means connected to said flow line in advance of said meter for removing separated gas and air from said liquid prior to reaching the meter, said air removing means including a chamber subject to fluctuations in pressure during the dispensing flow and during removal of vapor and air from the liquid flowing therethrough, means connecting said pressure actuatable means of said chamber and said resetting means, said actuatable means being operable at a pressure in said chamber lower than the fluid pressure therein at which liquid is discharged from said chamber through said metering means for actuating said resetting means.

3. In a liquid dispensing device, the combination of means forming a dispensing line through which liquid is adapted to be forced under pressure, a meter in said line, indicating means associated with said meter, resetting mechanism for said indicating meter including pressure actuable means, air removing means disposed in said line in advance of said meter and including a liquid receiving chamber provided with a restricted liquid and air outlet, means associated with the restricted outlet of said chamber for building up pressure in said chamber prior to and during the dispensing and for releasing pressure in said chamber and for restoring said chamber to atmospheric pressure after dispensing said chamber having a connection with the inlet side of the liquid flow line for receiving the liquid under pressure and said pressure chamber having an outlet connected to the inlet side of the meter, normally closed valve means in said outlet connection to the meter, and a fluid pressure connection from said pressure chamber to the reset mechanism.

4. In a liquid dispensing device, the combination of means forming a liquid dispensing line, a pump for forcing liquid through said line, a motor for actuating said pump, a switch for starting and stopping said motor, a meter in said line, indicating means associated with said meter, reset means for said indicating means, means in said line in advance of said meter forming a fluid pressure chamber, a spring-loaded valve normally closing the outlet of said fluid pressure chamber to said line, said fluid pressure chamber having a constantly open restricted vent connected to atmosphere, a resetting cylinder, a piston in said cylinder, a fluid pressure connection from one end of said cylinder to said fluid pressure chamber and a pressure connection from the other end of said cylinder to that part of the chamber which is vented to atmosphere, spring means for returning said piston to normal position, and a connection from said piston to said reset means to actuate the same, said spring also conditioning said reset means.

5. In a liquid dispensing device the combination of means forming a dispensing line through which liquid is adapted to flow under pressure, a power driven pump for delivering liquid through said line, a meter in said line adapted to be actuated by the fluid flowing therethrough, indicating means operatively associated with said meter, resetting means for said indicating means, valve means in said line in advance of the meter adapted to be opened upon the attainment of a predetermined pressure in said line whereby to by-pass the fluid discharged by said pump back to the inlet side of said pump, a second valve in said line adapted to open under a lower pressure than said by-pass valve, said second valve being disposed between the discharge side of said pump and the inlet side of said meter, and pressure operable means disposed in said line between the discharge side of said pump and said second mentioned valve and adapted to be actuated at a pressure lower than the pressure which will open said second valve whereby to actuate said resetting mechanism.

6. In a liquid dispensing device the combination of means forming a dispensing line through which liquid is adapted to flow under pressure, a power driven pump for delivering liquid through said line, a meter in said line adapted to be actuated by the fluid flowing therethrough, indicating means operatively associated with said meter, resetting means for said indicating means, an air separator mechanism in said line disposed between the discharge side of the pump and the inlet side of said meter, said air separator mechanism comprising a pressure chamber adapted to receive liquid discharging from said pump, said air separator chamber having a constantly open port to atmosphere and having means for returning any liquid passing through said port back to said chamber, said chamber having an additional port connecting to pressure operating means for actuating the resetting mechanism, and said chamber having a spring-pressed valve normally closed and adapted to open to connect said chamber to the inlet side of the meter, said spring-pressed valve being constructed and arranged to open at a pressure relatively higher than the pressure required to actuate said resetting mechanism.

7. In a liquid dispensing device the combination of means forming a dispensing line through which liquid is adapted to flow under pressure, a power driven pump for delivering liquid through said line, a meter in said line adapted to be actuated by the fluid flowing therethrough, indicating means operatively associated with said meter, resetting means for said indicating means, an air separator mechanism disposed in the flow line between the discharge side of the pump and the inlet side of the meter, said air separating mechanism comprising a pressure chamber connected to the discharge side of the pump and having a spring-pressed valve connection back to the inlet side of the pump, said spring-pressed valve opening at a predetermined pressure, said chamber likewise having a constantly open restricting orifice to atmosphere through which orifice liquid and air is adapted to flow during the operation of the pump whereby to drive the air to atmosphere there being a second chamber connected to the discharge side of said restricted orifice having flow control means for returning liquid passing through orifice back to the inlet side of said pump, said pressure chamber having a second spring-pressed valve normally closed and adapted to open at a pressure relatively lower than the opening pressure of said first opening valve whereby to connect the said first pressure chamber with the inlet side of the meter, said pressure chamber having an additional connection to a pressure operated device, and including means actuatable by said pressure operating device for actuating the resetting mechanism, said pressure operating device being adapted to be actuated by the creation of a pressure in said pressure chamber which is relatively less than the pressure at which said second mentioned valve is adapted to open.

8. In a liquid dispensing device the combination of means forming a dispensing line through which liquid is adapted to flow under pressure, a power driven pump for delivering liquid through said line, a meter in said line adapted to be actuated by the fluid flowing therethrough, indicating means operatively associated with said meter, resetting means for said indicating means, an air separator mechanism disposed in the flow line between the discharge side of the pump and the inlet side of the meter, said air separating mechanism comprising a pressure chamber connected to the discharge side of the pump and having a spring-pressed valve connection back to the inlet side of the pump, said spring-pressed valve opening at a predetermined pressure, said chamber likewise having a constantly open restricting orifice to atmosphere through which orifice liquid and air is adapted to flow during the operation of the pump whereby to drive the air to atmosphere there being a second chamber connected to the discharge side of said restricted orifice having flow control means for returning liquid passing through orifice back to the inlet side of said pump, said pressure chamber having a second spring-pressed valve normally closed and adapted to open at a pressure relatively lower than the opening pressure of said first opening valve whereby to connect the said first pressure chamber with the inlet side of the meter, said pressure chamber having an additional connection to a pressure operated device, and including means actuatable by said pressure operating device for actuating the resetting mechanism, said pressure operating device being adapted to be actuated by the creation of a pressure in said pressure chamber which is relatively less than the pressure at which said second mentioned valve is adapted to open, said second mentioned chamber likewise having a connection to the pressure operating mechanism which actuates the resetting mechanism whereby to permit said reset actuating mechanism to be restored to zero pressure.

9. In a liquid dispensing device the combination of means forming a dispensing line through which liquid is adapted to flow under pressure, a power driven pump for delivering liquid through said line, a meter in said line adapted to be actuated by the fluid flowing therethrough, indicating means operatively associated with said meter, resetting means for said indicating means, air separating mechanism disposed in a line between the discharge side of the pump and the inlet side of the meter and including a pressure chamber connected to the discharge side of the pump and connected by means of a normally closed spring-pressed valve to the inlet side of the meter, said pressure chamber having a constantly open orifice connected to a second chamber adapted to receive liquid and air passing through said open orifice, said second chamber having a constantly open connection to the atmosphere and having connection back to the suction side of the pump, actuating mechanism for the resetting means comprising a cylinder, an actuating piston in said cylinder, a spring for actuating said piston in one direction, said cylinder having a pressure connection to said pressure chamber, and said spring being of sufficient tension to permit the actuation of said piston at a pressure in said pressure chamber relatively lower than the pressure at which said valve is adapted to open, there being a second connection from said cylinder from the opposite side of said cylinder to said second mentioned chamber.

10. In a liquid dispensing device the combination of means forming a dispensing line through which liquid is adapted to flow under pressure, a power driven pump for delivering liquid through said line, a meter in said line adapted to be actuated by the fluid flowing therethrough, indicating means operatively associated with said meter, resetting means for said indicating means, air separating mechanism disposed in a line between the discharge side of the pump and the inlet side of the meter and including a pressure chamber connected to the discharge side of the pump and connected by means of a normally closed spring-pressed valve to the inlet side of the meter, said pressure chamber having a constantly open orifice connected to a second chamber adapted to receive liquid and air passing through said open orifice, said second chamber having a constantly open connection to the atmosphere and having connection back to the suction side of the pump, actuating mechanism for the resetting means comprising a cylinder, an actuating piston in said cylinder, a spring for actuating said piston in one direction, said cylinder having a pressure connection to said pressure chamber, and said spring being of sufficient tension to permit the actuation of said piston at a pressure in said pressure chamber relatively lower than the pressure at which said valve is adapted to open, there being a second connection from the opposite side of said cylinder to said second mentioned chamber, and automatically disengageable latching mechanism interconnecting said piston and the resetting mechanism whereby to cause the automatic fluid pressure actuation of the resetting mechanism prior to the opening of said valve and whereby to cause automatic disengagement of said piston and said resetting mechanism upon the completion of said resetting operation.

11. In a liquid dispensing device the combination of means forming a dispensing line through which liquid is adapted to flow under pressure, a power driven pump for delivering liquid through said line, a meter in said line adapted to be actuated by the fluid flowing therethrough, indicating means operatively associated with said meter, resetting means for said indicating means, air separating mechanism disposed in a line between the discharge side of the pump and the inlet side of the meter and including a pressure chamber connected to the discharge side of the pump and connected by means of a normally closed spring-pressed valve to the inlet side of the meter, said pressure chamber having a constantly open orifice connected to a second chamber adapted to receive liquid and air passing through said open orifice, said second chamber having a constantly open connection to the atmosphere and having connection back to the suction side of the pump, actuating mechanism for the resetting means comprising a cylinder, an actuating piston in said cylinder, a spring for actuating said piston in one direction, said cylinder having a pressure connection to said pressure chamber, and said spring being of sufficient tension to permit the actuation of said piston at a pressure in said pressure chamber relatively lower than the pressure at which said valve is adapted to open, there being a second connection from said cylinder from the opposite side of said cylinder to said second mentioned chamber, and automatically disengageable latching mechanism interconnecting said piston to a sector pivotally mounted and adapted to be actuated by movement of said piston, a gear having a one-way clutch connection to the reset shaft and adapted to mesh with the teeth of said sector, latching means operable upon movement of the piston in one direction to drive said sector whereby to actuate said gear to accomplish resetting, and means carried by said sector and operated upon the completion of said resetting to disengage said latching means.

12. In a liquid dispensing device the combination of means forming a dispensing line through which liquid is adapted to flow under pressure, a power driven pump for delivering liquid through said line, a meter in said line adapted to be actuated by the fluid flowing therethrough, indicating means operatively associated with said meter, resetting means for said indicating means, a pressure chamber disposed in the flow line between the discharge side of the pump and the inlet side of the meter, said pressure chamber having a constantly open restricted orifice communicating with the second chamber, said second chamber having a constantly open orifice to atmosphere, a normally closed spring-pressed valve closing communication between said first chamber and the inlet side of the meter, said valve being adapted to open upon the creation of a predetermined pressure in said first mentioned chamber due to the operation of the pump, a cylinder, a piston in said cylinder, a spring normally forcing the piston in one direction in said cylinder, a connection to one end of said cylinder to said second chamber and a connection from the opposite end of said cylinder to said first mentioned chamber, said connections and said spring for the piston being constructed and arranged to cause the actuation of said piston by means of fluid pressure created in said first mentioned chamber at a pressure relatively lower than the pressure at which said valve is adapted to open, an automatically actuatable means operated by the movement of said piston when actuated by the fluid pressure for operating the resetting mechanism, including means causing said spring to return the reset actuating mechanism to initial position upon the completion of resetting.

13. In a liquid dispensing device the combination of means forming a dispensing line through which liquid is adapted to flow under pressure, a power driven pump for delivering liquid through said line, a meter in said line adapted to be actuated by the fluid flowing therethrough, indicating means operatively associated with said meter, resetting means for said indicating means, an air separator in the flow line between the discharge side of the pump and the inlet side of the meter, including a pressure chamber having a constantly open connection to atmosphere, a cylinder, an actuatable piston in said cylinder having connection with the reset mechanism for actuating the latter, spring means for restoring said piston to inactive position, and fluid pressure connections from said pressure chamber to said cylinder and from said cylinder to atmosphere, and a normally closed pressure actuated valve disposed in the flow line between said pressure chamber and the inlet side of the meter, and said valve adapted to open at a pressure relatively higher than the pressure in said pressure chamber which is adapted to actuate the piston in said cylinder.

14. In a liquid dispensing device, the combination of means forming a dispensing line through which liquid is adapted to flow under pressure, a power driven pump for delivering liquid through said line, a meter in said line adapted to be actuated by the fluid flowing therethrough, indicating means operatively associated with said meter, resetting means for said indicating means, actuating mechanism for the resetting means including a fluid pressure chamber disposed in the dispensing line between the discharge side of the pump and the inlet side of the meter, and means operable upon the completion of the dispensing operation for substantially lowering the pressure in said pressure chamber to condition the reset mechanism for subsequent operation.

15. In a liquid dispensing device, the combination of means forming a dispensing line through which liquid is adapted to flow under pressure, a power driven pump for delivering liquid through said line, a meter in said line adapted to be actuated by the fluid flowing therethrough, indicating means operatively associated with said meter, resetting means for said indicating means, fluid pressure actuating mechanism for actuating said resetting means including a fluid pressure chamber disposed in the dispensing line between the discharge side of the pump and the inlet side of said meter, liquid pressure means connecting said chamber with said actuating mechanism for actuating said reset mechanism upon the rise of pressure in said chamber, means automatically operative upon the termination of the dispensing operation for lowering the pressure in said pressure chamber to substantially atmospheric pressure, and an air relief means connecting the relief side of said fluid actuator to atmosphere to condition said actuator for subsequent resetting operation.

16. In a liquid dispensing device, the combination of means forming a dispensing line through which liquid is adapted to flow under pressure, a power driven pump for delivering liquid through said line, a meter in said line adapted to be actuated by the fluid flowing therethrough, indicating means operatively associated with said meter, resetting means for said indicating means, means associated with said dispensing line and providing a pressure chamber disposed therein between the discharge side of the pump and the inlet side of the meter in which a fluid pressure condition is created by the operation of the pump, said chamber having a connection to atmosphere whereby to restore said chamber to atmospheric pressure after dispensing, and shiftable means adapted to be actuated by the fluid pressure in said pressure chamber for actuating said resetting means, said shiftable means including means to preclude the passage of fluid therethrough when shifted to actuate said resetting mechanism.

17. In a liquid dispensing device, the combination of means forming a dispensing line through which liquid is adapted to flow under pressure, a power driven pump for delivering liquid through said line, a meter in said line adapted to be actuated by the fluid flowing therethrough, indicating means operatively associated with said meter, resetting means for said indicating means, means associated with said dispensing line and providing a liquid containing chamber disposed therein between the discharge side of the pump and the inlet side of the meter in which a fluid pressure condition is created by the operation of the pump, shiftable means adapted to be actuated by the fluid pressure in said liquid containing chamber for actuating said resetting means, said shiftable means including mechanism for precluding the passage of fluid therethrough when shifted to actuate said resetting mechanism, means for automatically substantially lowering the fluid pressure in said liquid containing pressure chamber upon the termination of the dispensing operation, and power means operable upon the lowering of said pressure for automatically returning said shiftable means to initial position.

18. In a liquid dispensing device, the combination of means forming a dispensing line through which liquid is adapted to flow under pressure, a power driven pump for delivering liquid through said line, a meter in said line adapted to be actuated by the liquid flowing therethrough, indicating means operatively associated with said meter, resetting means for said indicating means, fluid pressure actuating means for operating said resetting means, and means disposed in said dispensing line between the pump and the meter and having a constantly open fluid pressure connection to said fluid pressure actuating means and having a connection to atmosphere, said fluid pressure actuating means having a pressure relieving portion having a connection to atmosphere whereby, upon the operation of said pumping means, fluid pressure will rise in said means disposed in said line between the pump and meter to actuate said fluid pressure actuating means to operate the resetting mechanism and whereby, upon termination of said pumping means, the pressure in said means will fall to substantially atmospheric pressure to cause the conditioning of said fluid pressure actuating means for subsequent actuation of said reset mechanism.

19. In a liquid dispensing device, the combination of means forming a dispensing line through which liquid is adapted to flow under pressure, a power driven pump for delivering liquid through said line, a meter in said line adapted to be actuated by fluid flowing therethrough, indicating means operatively associated with said meter, resetting means for said indicating means, fluid pressure actuating means for said resetting means including means operable at a pressure substantially above atmospheric, and means forming a fluid pressure chamber disposed in the dispensing line between the pump and the meter and having a fluid pressure connection to said fluid pressure actuating means, said pressure chamber having a constantly open restricted opening connected to atmosphere and constructed and arranged and of such size to permit the free passage of air therethrough while restricting the passage of liquid therethrough and so that upon operation of the pumping means liquid pressure will be created in said pressure chamber to actuate said fluid pressure actuating means and whereupon gaseous medium in said pressure chamber will be passed through said constantly open restricted orifice to atmosphere without reconditioning said actuating means, and whereby upon cessation of said pumping means fluid pressure in said chamber will fall to substantially atmospheric pressure to condition said fluid pressure actuating means for subsequent resetting actuation.

20. In a liquid dispensing device, the combination of means forming a dispensing line through which liquid is adapted to flow under pressure, a power driven pump for delivering liquid through said line, a meter in said line on the discharge side of the pump and adapted to be actuated by the liquid flowing therethrough, indicating means operatively associated with said meter, resetting means for said indicating means, fluid pressure actuating means for operating said resetting means, including a cylinder and a piston operable therein, there being spring means for returning said piston to inoperative position, means forming a fluid pressure chamber in said dispensing line between the pump and the meter, and a liquid connection from said chamber to one end of said fluid pressure cylinder, said chamber having means for discharging separated air to atmosphere, the opposite end of said fluid pressure cylinder having an air relief passage connecting to atmosphere, said air discharging means of pressure chamber being constructed and arranged whereby upon initiation of the pumping means fluid pressure is created in said chamber to cause the creation of pressure in one end of said cylinder to actuate the piston to operate the reset mechanism and whereby upon the cessation of said pumping means said chamber will be returned to atmospheric pressure and whereby to permit the spring to actuate said piston for conditioning the reset mechanism for subsequent reset actuation.

21. In a liquid dispensing device, the combination of means forming a dispensing line through which liquid is adapted to flow under pressure, a power driven pump for delivering liquid through said line, a meter in said line adapted to be actuated by the liquid flowing therethrough, indicating means operatively associated with said meter, resetting means for said indicating means, fluid pressure actuating means for operating said resetting means, including a cylinder and a piston operable therein, there being spring means for returning said piston to initial position, a pressure chamber disposed in said line between the pump and the meter, said pressure chamber having a partition providing a float chamber and an air dome thereabove, a constantly open restricted bore between the pressure chamber and the float chamber, a float in said chamber, a valve actuated thereby, said valve connecting said float chamber with the inlet side of said pumping means, a liquid connection from said pressure chamber to one end of said cylinder, an air connection from the opposite end of said cylinder to said air dome, spring means in said cylinder for normally returning the piston to that end of the cylinder to which the liquid connection is made, and means connecting said air dome to atmosphere.

22. In a liquid dispensing device, the combination of means forming a dispensing line through which liquid is adapted to flow under pressure, a meter in said line adapted to be actuated by liquid flowing therethrough, indicating means operatively associated with said meter, resetting means for said indicating means, a fluid pressure cylinder, a piston in said cylinder, said piston being connected to said resetting means for actuating the latter, a spring in said cylinder for actuating said piston in one direction only, means forming a box-like pressure chamber having a liquid inlet connected to a source of supply and having partitioned walls forming an internal pressure chamber, a separate float chamber, an air dome thereabove, a pump disposed in said box-like member and having its inlet connected to the inlet chamber of the box-like member and having its discharge connected to the internal pressure chamber, a float controlled valve and passage connecting the float chamber with the inlet side of the pump, a by-pass valve disposed in said internal pressure chamber and connecting said chamber with the inlet side of the pump, and an auxiliary valve disposed in said internal pressure chamber and connecting said pressure chamber with the outlet from said box-like structure, said internal pressure chamber having a constantly open restricted orifice connecting it with said float chamber and having substantially below said orifice a constantly open liquid connection with one end of said pressure cylinder, the opposite end of said pressure cylinder having an air connection with the air dome, said air dome likewise having a connection to atmosphere, said pressure chamber being constructed and arranged whereby upon initiation of the pump, pressure will be created in said internal pressure chamber to cause liquid to actuate the piston of the fluid pressure cylinder to actuate the reset mechanism and whereby upon cessation of said pump the pressure in said pressure chamber will become atmospheric whereby to permit the spring to condition said pressure cylinder for subsequently actuating the reset mechanism.

23. In a liquid dispensing device, the combination of means forming a dispensing line through which liquid is adapted to flow under pressure, a power driven pump for delivering liquid through said line, a meter in said line adapted to be actuated by the liquid flowing therethrough, indicating means operatively associated with said meter, resetting means for said indicating means, means forming a chamber in the dispensing line between the discharge side of the pump and the inlet side of the meter, through which chamber liquid when dispensing is adapted to flow, said chamber having a constantly open liquid passage, a fluid pressure actuator connected with said liquid passage, said fluid pressure actuator being connected to said reset mechanism to actuate the same, the upper portion of said chamber having a constantly open restricted bore, a liquid recovery chamber connecting with said bore, said liquid recovery chamber having a connection back to the dispensing system and having a constantly open connection to atmosphere, means upon actuation of said pumping means for creating a fluid pressure in said chamber, and means actuated by the fluid pressure in said chamber for actuating the reset mechanism, said liquid recovery chamber freely discharging air accumulating in said chamber to atmosphere, said discharge to atmosphere of said recovery chamber forming means upon the cessation of said pumping means for returning said chamber and said recovery chamber to atmospheric pressure whereby to condition said reset mechanism for subsequent actuation.

24. In a liquid dispensing device, means forming a dispensing flow line, means forming a liquid containing chamber in said line and a meter in said line connected to the outlet of said chamber, indicating means for said meter and reset mechanism therefor, a fluid pressure actuator for said resetting mechanism, valve means disposed in said chamber for controlling the chamber outlet, said chamber having an inlet connected with a source of supply for said dispensing line, and power operated pumping means for delivering liquid from said source of supply through said line to said chamber, said chamber having a by-pass valve connecting with the inlet side of the pump, said chamber likewise having a constantly open liquid conduit connection to said pressure cylinder, said liquid containing chamber having a constantly open restricted opening, there being a liquid return line from the discharge of said restricted opening connecting with the flow line and there being a connection from said restricted opening to atmosphere for discharging accumulated air and for returning the pressure in the liquid containing chamber to atmospheric upon cessation of the pump.

25. In a liquid dispensing device, an air separator therefor including a main housing having a liquid inlet connection adapted to be connected in series with the gasoline supply, said housing having internal walls providing a main liquid receiving chamber, a float chamber disposed thereabove, a pump chamber disposed laterally of said receiving chamber, and a recovery chamber and a conduit connecting the float chamber with the recovery chamber, said housing having additional walls providing a discharge conduit and providing a by-pass conduit disposed above said receiving chamber and connecting the liquid receiving chamber with the inlet side of the pump, pump mechanism disposed in said pump chamber, a valve adapted to connect the liquid receiving chamber with the discharge conduit, and a second valve adapted to connect the liquid receiving chamber with the by-pass conduit, said conduit between the receiving chamber and the float chamber being provided with a restricted bore adapted to pass air and a restricted volume of liquid therethrough, float means in said float chamber adapted to connect said chamber with the recovery chamber, each of said valves having a piston disposed in said liquid receiving chamber adapted to be operated by the pressure of liquid therein, and said float chamber having connection to atmosphere.

26. In a device of the class described in combination with a liquid dispensing line, a pump for forcing liquid through said line, an air separator disposed on the discharge side of the pump, a meter disposed on the discharge side of the air separator, said meter having an indicator driven thereby, resetting mechanism for said indicator, air separating means disposed between the discharge side of the pump and said meter for removing air in the liquid before said liquid reaches the meter, and comprising a chamber subject to wide fluctuations from a substantial pressure at which liquid is forced through the meter to substantially atmospheric pressure incident to the termination of the dispensing operation, and pressure actuatable means connected to said chamber and operable by a degree of pressure therein substantially lower than the pressure in said chamber required during liquid dispensing operation.

27. In a liquid dispensing device, the combination of means forming a liquid flow line through which liquid is adapted to flow under pressure, a meter in said flow line, indicating means associated with said meter, resetting means for said indicating means, means forming an air eliminating and liquid receiving chamber in said dispensing line in advance of said meter, means for subjecting said liquid receiving chamber to atmospheric conditions and also for causing fluid pressure conditions to be built up in said chamber before and during dispensing, which conditions are substantially higher than atmospheric pressure, said air elimination from said chamber being accompanied by a substantial drop of the fluid pressure conditions in said chamber and means connecting said liquid receiving chamber with said resetting mechanism including means whereby said resetting means is operable at a pressure substantially less than the pressure at which air is eliminated from said chamber.

28. In a liquid dispensing device, the combination of means forming a dispensing line through which liquid is adapted to flow under pressure, a power driven pump for delivering liquid through said line, a meter in said line adapted to be actuated by the liquid flowing therethrough, indicating means operatively associated with said meter, resetting means for said indicating means, shiftable means actuated in a predetermined direction by the pressure of the liquid in said line for actuating said resetting means, said fluid pressure actuated means being connected to the dispensing line between the meter and the discharge side of the pump and actuated by the pressure of the liquid flowing in a part of said line for so actuating said resetting means, means including a constant connection to atmosphere and automatically operative upon the completion of the resetting operation for actuating said shiftable means to condition the resetting mechanism for subsequent operation.

BURDETTE W. FOSS.

CERTIFICATE OF CORRECTION.

Patent No. 2,289,003.　　　　　　　　　　　　　July 7, 1942.

BURDETTE W. FOSS.

It is hereby certified that error appears in the printed specification of the above numbered patent requiring correction as follows: Page 8, second column, line 52, strike out the word "pressure"; and that the said Letters Patent should be read with this correction therein that the same may conform to the record of the case in the Patent Office.

Signed and sealed this 4th day of May, A. D. 1943.

(Seal)

Henry Van Arsdale,
Acting Commissioner of Patents.